Patented July 18, 1944

2,353,687

UNITED STATES PATENT OFFICE 2,353,687

CYANOALDEHYDES AND PROCESS OF PRODUCING THEM

Herman A. Bruson and Thomas W. Riener, Philadelphia, Pa., assignors to The Resinous Products & Chemical Company, Philadelphia, Pa., a corporation of Delaware No Drawing. Application November 18, 1942, Serial No. 466,050

8 Claims. (Cl. 260—464)

This invention relates to the preparation of cyanoethyl derivatives of aldehydes.

We have found that aldehydes which have at least two carbon atoms and which are free from interfering acidic groups react with acrylonitrile in the presence of alkaline condensing agents to form cyanoethylated derivatives.

The reaction is generally applicable to all types of aldehydes having at least two carbon atoms which are free from interfering acidic groups. These aldehydes may possess one or more hydrogen atoms on a carbon atom contiguous to the —CHO group, as occur, for instance, in the case of acetaldehyde, methoxy- or other alkoxy-acetaldehyde, phenoxyacetaldehyde, aldol, paraldehyde, propionaldehyde, butyraldehyde, isobutyraldehyde, valeraldehyde, hexylaldehyde, heptaldehyde, oleyl aldehyde, octadecylaldehyde, diethyl acetaldehyde, ethyl butyl acetaldehyde, acrolein, crotonaldehyde, methyl propyl acetaldehyde, cinnamaldehyde, tetrahydrofurfural, cyclohexyl aldehyde, diphenyl acetaldehyde, phenyl acetaldehyde and their homologues. The aldehydes can, however, be devoid of hydrogen on the α-carbon atom, in which case reaction may occur with the hydrogen of the aldehyde group, as in the case of benzaldehyde, naphthaldehyde, anthraldehyde and their nuclear substituted derivatives, including, for example, their halogen, alkoxy, or aryloxy derivatives. Furthermore, the reaction is applicable to furfural, α-methyl-β-ethyl acrolein, α-methyl acrolein, α-ethyl-β-propyl acrolein, and the like. In short, the reaction is applicable to aliphatic, cycloaliphatic, aromatic, or heterocyclic aldehydes, saturated or unsaturated, straight chain or branched chain, which are free from acidic groups. Formaldehyde is inoperative for the above reactions.

The aldehydes of the formula

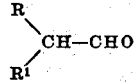

wherein R and R¹ are alkyl groups, preferably having at least two carbon atoms in each, are of considerable interest. They yield cyanoethylated products having the formula

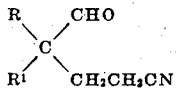

in which the nitrile group and the —CHO group are capable of further reaction.

The cyanoethylation products vary from well-defined organic compounds, which are in many cases crystalline or liquid, to resinous products, depending upon the nature of the aldehyde used and the proportions of acrylonitrile employed. In all cases, however, insofar as the structure formed has been determinable, the products formed contain one or more β-cyanoethyl radicals CN—CH₂—CH₂— directly attached to one or more carbon atoms of the original aldehyde employed or of a polymer or condensation product thereof.

As alkaline condensing agents for effecting the reaction, there may be used any of the oxides, hydroxides, amides, hydrides, or alcoholates of the alkali metals, the alkali metals themselves, hydroxides of the alkaline earth metals, or strongly basic quaternary ammonium hydroxides. Typical of these agents are sodium and potassium hydroxide, sodium methylate, potassium ethylate, barium hydroxide, benzyl trimethyl ammonium hydroxide, etc. The quantity of alkaline condensing agent required is small, amounts from 0.5% to 5% of the reactants usually being sufficient. Inert solvents such as benzene, dioxane, tertiary butyl alcohol, or ether can be used to suspend or dissolve the reactants. The reaction occurs readily at room temperature and is exothermic, so that it is generally advisable to control the reaction by cooling, at least at the start, as well as by gradual combination of the reactants and/or the use of solvent. Thus, the reaction may be initiated at a temperature as low as 0° C. Higher temperatures, even up to those of a steam bath, may be used to complete the reaction in some cases, but it is generally desirable to control the temperature to prevent undesirable side reactions.

The invention is illustrated by the following examples, it being understood that a similar procedure is applicable to the obvious homologues of the aldehydes used.

Example 1

(a) To a stirred mixture consisting of 100 parts of tertiary butyl alcohol, 5 parts of 30% methanolic potassium hydroxide solution, and 100 parts of freshly distilled diethyl acetaldehyde, there was added dropwise 53 parts of acrylonitrile during the course of forty minutes while the reaction mixture was maintained at 35°–38° C. by means of external cooling. The mixture was stirred for three and one-half hours thereafter at room temperature. Dilute hydrochloric acid was then added to destroy the alkali and the slightly acidic mixture was washed thoroughly with cold water. The residual oil was then distilled in vacuum.

The product, α-(2-cyanoethyl)-α-ethyl butyraldehyde,

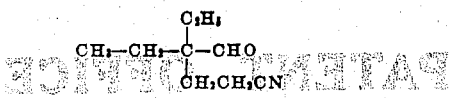

distilled over at 125°–132° C. at 6 mm. as a colorless liquid in a yield of 101 parts. Upon redistillation, it boiled at 128°/4 mm.

(b) In a similar manner, methyl-n-hexyl acetaldehyde yields α-(2-cyanoethyl)-α-methyl octylaldehyde as a colorless oil.

*Example 2*

(a) Acrylonitrile (53 parts) was added gradually during one-half hour to a stirred mixture consisting of 128 parts of freshly distilled butyl ethyl acetaldehyde, 100 parts of tertiary butyl alcohol, and 10 parts of 30% methanolic potassium hydroxide solution, while the reaction temperature was maintained at 30°–40° C. After all of the acrylonitrile had been added, the mixture was stirred at room temperature for one and one-half hours and was then faintly acidified with dilute hydrochloric acid. The mixture was poured into water, the oil layer separated, washed, dried, and distilled in vacuum.

The product, α-(2-cyanoethyl)-α-ethyl hexaldehyde,

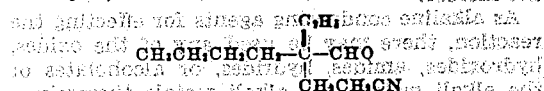

distilled over at 145°–150°/6 mm. as a colorless oil in a yield of 136 parts. Upon redistillation it boiled at 140°–142°/5 mm.

(b) In a similar manner, methyl phenyl acetaldehyde yields α-(2-cyanoethyl)-α-methyl phenylacetaldehyde as a colorless oil.

*Example 3*

Acrylonitrile (106 parts) was added dropwise to a stirred mixture consisting of 106 parts of pure benzaldehyde, 100 parts of dioxane, and 5 parts of aqueous 40% trimethyl benzyl ammonium hydroxide while the solution was stirred and maintained at 30°–35° C. After all of the acrylonitrile had been added, the mixture was stirred for eight hours at room temperature. The product was made faintly acid with dilute hydrochloric acid. It was then washed thoroughly with water, dried, and distilled in vacuum. Two main fractions were collected:

(I) 46 parts at 195°–240° C./5 mm.
(II) 67 parts at 240°–290° C./5 mm.

Fraction I, upon refractionation, yielded an oil with a boiling point of 225°–230°/5 mm., containing 12.78% nitrogen by analysis, a dicyanoethylation product.

Fraction II, upon redistillation, yielded a fraction boiling at 270°/3 mm., which rapidly solidified to a crystalline mass. After recrystallization from ethanol, it formed colorless needles having a melting point of 73° C., containing 9.11% nitrogen by analysis.

*Example 4*

To a stirred solution of 70 parts of technical orthochlorobenzaldehyde, 100 parts of tertiary butyl alcohol, and 5 parts of methanolic 30% potassium hydroxide solution, there was gradually added 79.5 parts of acrylonitrile during the course of thirty minutes while the reaction temperature was maintained at 35°–38° C. The mixture was then stirred for one and one-half hours longer at room temperature, after which it was acidified with dilute hydrochloric acid and then washed with water and dried in vacuum to yield 123 parts of a partially crystalline mass. Alcohol was added and a crystalline material (18 parts) was filtered off. After recrystallization from ethanol, this product formed colorless needles, with a melting point of 125° C., containing 19.06% Cl and 7.41% N by analysis.

The filtrate was evaporated to dryness and distilled in vacuum. Two main fractions were collected:

(I) 42 parts, boiling point 225°–240°/6 mm.
(II) 16.5 parts, boiling point 240°–290°/6 mm.

Upon redistillation, fraction I yielded a cut (28 parts), boiling at 230°–235°/6 mm., as a pale yellow oil containing 14.2% Cl and 11.03% N by analysis.

Fraction II boiled at 280°–290°/6 mm. and became a crystalline solid (17 parts) in the cold, which, after recrystallization from ethanol, formed colorless needles, having a melting point of 125° C., identical with those originally filtered off.

*Example 5*

Acrylonitrile (53 parts) was added dropwise during the course of twenty minutes to a stirred mixture consisting of 126 parts of α-ethyl-β-propylacrolein, 126 parts of tertiary butyl alcohol, and 5 parts of methanolic 30% potassium hydroxide solution while the reaction temperature was maintained at 26°–32° C. The mixture was stirred thereafter for two hours at room temperature and was then acidified with dilute hydrochloric acid, washed, dried, and distilled in vacuum. The main fraction (79 parts) distilled at 140°–145°/6 mm. Upon redistillation, it boiled at 138°–141°/6 mm. and formed a pale yellow oil, corresponding to the probable formula:

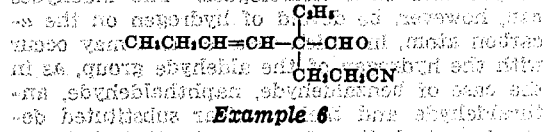

*Example 6*

Acrylonitrile (160 parts) was added dropwise to a stirred mixture of 88 parts of acetaldol, 100 parts of tertiary butyl alcohol, and 5 parts of methanolic 30% potassium hydroxide at 30°–40° C. The mixture was stirred three hours longer at room temperature, then acidified with dilute hydrochloric acid and washed with water. The residual oil, after being dried in vacuo at 100° C., consisted of 120 parts of a honey-like dark cyanoethylated syrup containing 10.4% of nitrogen by analysis.

*Example 7*

A mixture of 86 parts of isobutyraldehyde and 63 parts of acrylonitrile was added dropwise to a stirred solution of 100 parts of tertiary butyl alcohol and 10 parts of methanolic 30% potassium hydroxide while the temperature was maintained at 10°–20° C. by cooling. After all of the aldehyde and nitrile had been added, the reaction mixture was stirred for one hour longer at 5°–10° C. and was then acidified with dilute hydrochloric acid, washed, and distilled in vacuum. The cyanoethylated product boils at 110°–120°/26 mm. and is a colorless liquid.

Example 8

Acrylonitrile (26 parts) was added dropwise to a stirred solution of 100 parts of α-amyl cinnamaldehyde, 100 parts of tertiary butyl alcohol, and 5 parts of methanolic 30% potassium hydroxide at 30°–35° C. The mixture was then stirred for two hours at room temperature, neutralized with dilute hydrochloric acid, washed, and distilled in vacuum.

Two main liquid fractions were collected, one of which (a) distilled at 220°–260°/8 mm. and the other (b) at 260°–290°/8 mm. Upon refractionation (a) yielded a cyanoethylated yellow oil boiling at 205°–225°/5 mm. and (b) yielded a cyanoethylated red oil, boiling at 260°–265° C./6 mm., containing 7.7% of nitrogen by analysis.

Example 9

A mixture of 70 parts of crotonaldehyde and 106 parts of acrylonitrile was added dropwise during forty-five minutes to a stirred solution of 5 parts of methanolic potassium hydroxide dissolved in 100 parts of tertiary butyl alcohol while the reaction mixture was cooled to 10°–15° C. The mixture was then stirred for eight hours at room temperature, and the dark red product acidified with dilute hydrochloric acid, washed with water, and dried in vacuum at 100° C. The cyanoethylated product was a dark red, viscous balsam containing about 7.6% of nitrogen by analysis.

The products obtained by the process herein described are useful as intermediates for the preparation of resins, insecticides, drugs, and many other technical purposes.

We claim:

1. The method of cyanoethylating a dialkyl acetaldehyde which comprises reacting a dialkyl acetaldehyde with acrylonitrile in the presence of an alkaline condensing agent.

2. The method for preparing a cyanoethyl aldehyde having the formula:

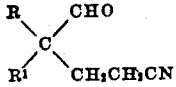

wherein R and R¹ are each alkyl groups, which comprises reacting acrylonitrile in the presence of an alkaline condensing agent with a dialkyl acetaldehyde having the formula:

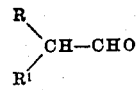

wherein R and R¹ are each alkyl groups.

3. The method for preparing cyanoethyl aldehydes having the formula:

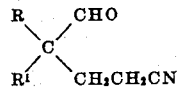

wherein R and R¹ are each alkyl groups containing at least two carbon atoms in each alkyl group, which comprises reacting acrylonitrile in the presence of an alkaline condensing agent with a dialkyl acetaldehyde having at least two carbon atoms in each alkyl group.

4. The process for preparing α-(2-cyanoethyl)-α-ethyl butyraldehyde which comprises reacting diethyl acetaldehyde with acrylonitrile in the presence of an alkaline condensing agent.

5. The process for preparing α-(2-cyanoethyl)-α-ethyl hexaldehyde which comprises reacting α-ethyl hexaldehyde with acrylonitrile in the presence of an alkaline condensing agent.

6. As a new chemical compound, a cyanoethylated dialkyl acetaldehyde having the formula:

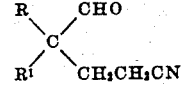

wherein R and R¹ are each alkyl groups.

7. As a new compound, α-(2-cyanoethyl)-α-ethyl butyraldehyde,

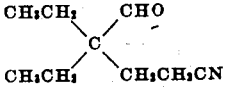

8. As a new compound, α-(2-cyanoethyl)-α-ethyl hexaldehyde,

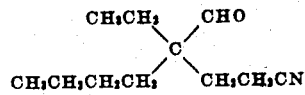

HERMAN A. BRUSON.
THOMAS W. RIENER.